United States Patent
Birkhold

(10) Patent No.: US 6,273,392 B1
(45) Date of Patent: Aug. 14, 2001

(54) BICYCLE-SUPPORTING DEVICE OF A BICYCLE STAND

(75) Inventor: Julius Birkhold, deceased, late of Steinheim (DE), by Lieselotte Birkhold, legal representative

(73) Assignee: Julius Birkhold GmbH (DE)

( * ) Notice: Subject to any disclaimer, the term of this patent is extended or adjusted under 35 U.S.C. 154(b) by 0 days.

(21) Appl. No.: 09/461,106

(22) Filed: Dec. 14, 1999

(30) Foreign Application Priority Data

Dec. 28, 1998 (DE) ............................................... 198 60 380

(51) Int. Cl.[7] .................................................. F16M 13/00
(52) U.S. Cl. .................. 248/622; 246/565; 246/122.1; 246/125.1; 246/125.2; 246/125.8; 246/172.1
(58) Field of Search ..................................... 248/622, 565, 248/122.1, 125.1, 125.2, 125.8, 157, 423, 177.1, 181.1; 211/22, 20, 17; D12/115

(56) References Cited

U.S. PATENT DOCUMENTS

| | | | |
|---|---|---|---|
| 598,040 | * | 1/1898 | Webster ................................. 211/22 |
| 3,352,426 | * | 11/1967 | Carlson .................................. 211/22 |
| 3,675,784 | * | 7/1972 | John ....................................... 211/20 |
| 3,981,491 | * | 9/1976 | Snyder .................................... 269/64 |
| 4,112,693 | * | 9/1978 | Collin et al. .......................... 405/132 |
| 5,320,227 | * | 6/1994 | Minoura ................................. 211/22 |
| 5,489,030 | * | 2/1996 | Kolbeck et al. ....................... 211/22 |
| 5,497,967 | * | 3/1996 | Gantois ................................. 248/166 |
| 5,544,763 | * | 8/1996 | McClain ................................ 211/22 |
| 5,873,552 | * | 2/1999 | Skarp ................................... 248/161 |
| 5,996,814 | * | 12/1999 | Workman et al. ...................... 211/22 |

FOREIGN PATENT DOCUMENTS

| | | |
|---|---|---|
| 3822455 | 1/1990 | (DE) . |
| 0625409 | 11/1994 | (EP) . |
| 583840 | 11/1924 | (FR) . |
| 2650549 | 8/1989 | (FR) . |

* cited by examiner

*Primary Examiner*—Leslie A. Braun
*Assistant Examiner*—A. Joseph Wujciak
(74) *Attorney, Agent, or Firm*—Ostrolenk, Faber, Gerb & Soffen, LLP

(57) ABSTRACT

Bicycle-supporting device for the presentation of bicycles, having a fork-shaped adapter composed of fiber-reinforced plastic. The adapter is on a telescoping support. Details of the connection of the adapter to the support are disclosed.

18 Claims, 3 Drawing Sheets

FIG. 2
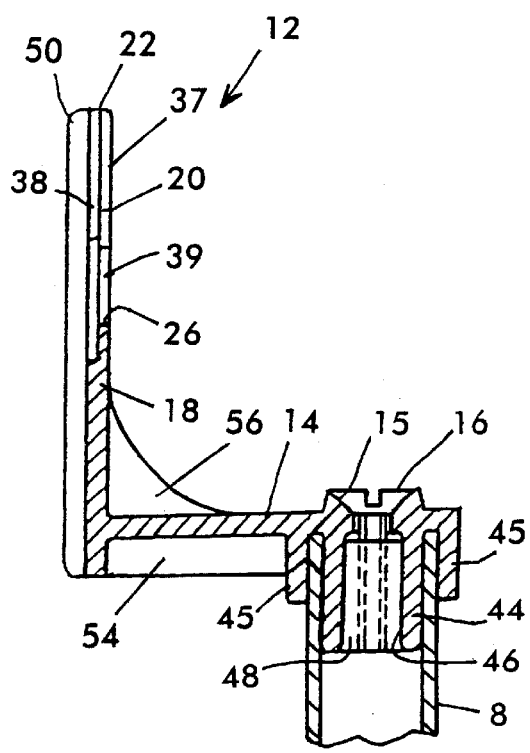
FIG. 3
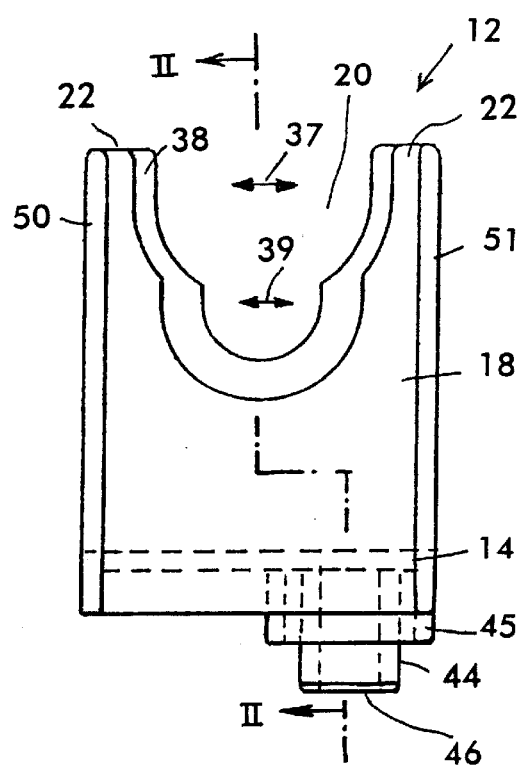
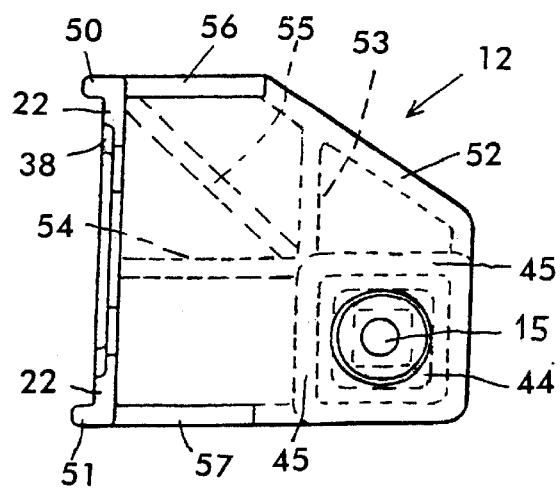
FIG. 4

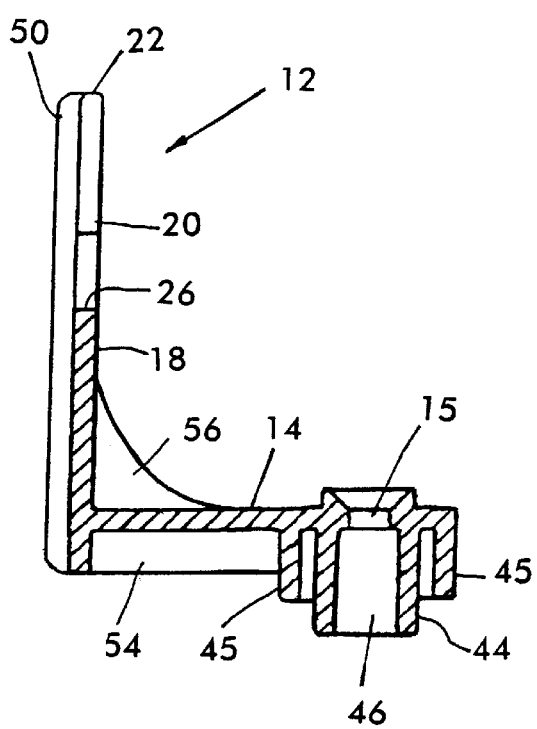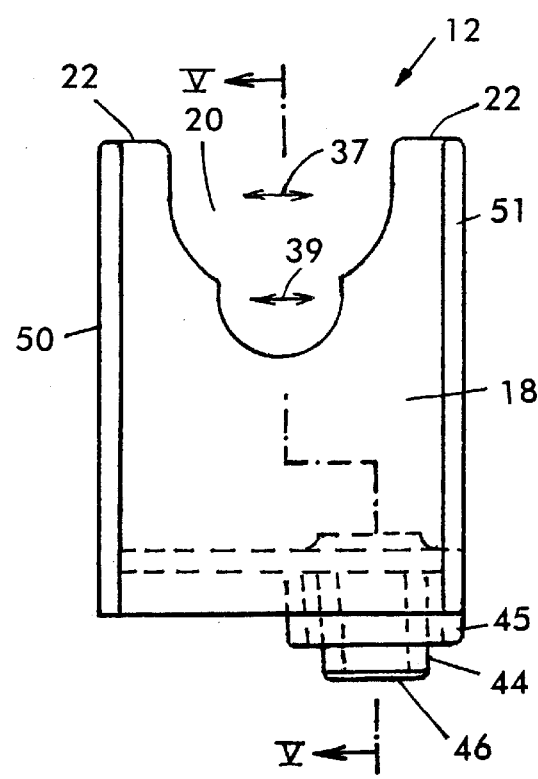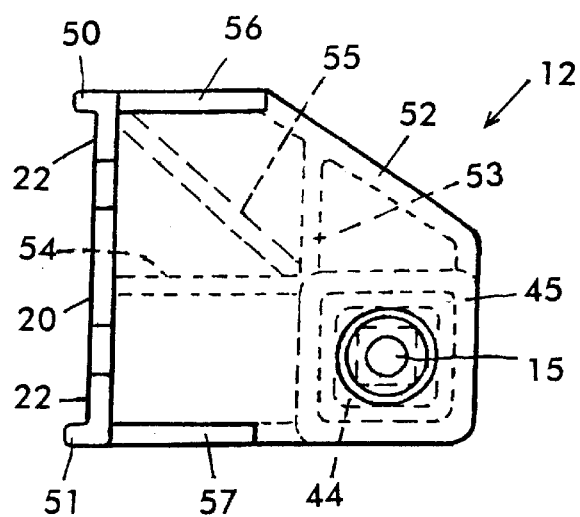

BICYCLE-SUPPORTING DEVICE OF A BICYCLE STAND

This application is based upon and claims benefit of German Application No. 19860380.0, filed Dec. 28, 1998, to which a claim of priority is made under 35 U.S.C. §119.

FIELD OF THE INVENTION

The invention relates to a bicycle-supporting device of a bicycle stand and particularly to the adapter that supports the bicycle.

THE PRIOR ART

Prior art for the invention includes DE 37 41 233 C2, DE 94 20 632 U1, DE 42 08 064 C2, DE 43 710 A1, DE 32 43 130 C2, DE 38 22 455 C2, DE 37 33 262 C2, DE 195 37 078 A1, GB 22 38 031 A, FR 26 50 549 A1, US 45 55 029, US 53 46 238 A, US 50 25 932.

DE-C-38 22 455 has disclosed a bicycle-supporting device of a bicycle stand which has an upwardly open U rail, into which the wheels of a bicycle can be placed, and a telescopic support projecting vertically upward from it. The telescopic support can be compressed vertically by the weight of the bicycle counter to the force of a spring accommodated in the telescopic support. At its upper end, the support has a cone with an upward-projecting conical point which can engage behind the bottom bracket of the bicycle into a recess in the bicycle frame. The rubber cone supports the bicycle close to its center of gravity, thus preventing it from tipping out of the rail. The cone thus serves as an adapter by means of which the telescopic support is adapted to the bicycle.

The use of a piece of sheet metal bent at right angles as an adapter instead of a cone is also known, wherein the vertical limb of the adapter has a recess between two upward-projecting fork prongs, in which the bottom bracket spindle of the bicycle can be supported. The other, horizontal, limb of the adapter, which is bent from sheet metal, has a downward-projecting, welded-on stud which is inserted into the upper end of the upper telescopic tube, designed as a square-section tube, and is secured therein by a pin which extends transversely through the upper telescopic tube and tangentially through a peripheral groove of the stud. This embodiment can be used for all bicycles but is intended in particular for bicycles with a frame that does not have a recess behind the bottom bracket to receive a cone. The fork-shaped adapter formed from bent sheet metal has the disadvantage that, despite having a reinforcing rib bent out laterally, it is very weak and can easily be bent by pressure from the bicycle. Reinforcement by welded-in reinforcing ribs would be expensive and, on many bicycles, the ribs would not permit use of the adapter. The use of a thicker metal sheet would have the disadvantage that the adapter would be heavy and, in the case of many bicycles, would no longer fit through the narrow gap between the bottom bracket shell and the pedal crank and, as a result, could no longer be fitted to the bottom bracket spindle. An adapter that is too heavy would minimize the opposing spring pressure of the resilient telescopic support which has to absorb the tilting moment of the bicycle. This means that spring pressure matching for the bicycles would be negatively affected. For the same reason, a sheet-metal adapter that is too heavy could furthermore not be used as a replacement for one of the cones mentioned. The bottom bracket shell and the pedal cranks should position the adapter axially on the bottom bracket spindle to ensure that the bicycle cannot tip sideways. A presentation stand can be provided with a large number of bicycle holders of this kind on one or more levels.

SUMMARY OF THE INVENTION

The invention is intended to achieve the object of constructing the fork-shaped adapter in such a way that it is sturdier, i.e. can withstand higher bicycle forces but is not disadvantageously heavy and does not require the fork part of the adapter to be made so thick that it can no longer engage in narrow interspaces between the bottom bracket shell and the pedal crank. The bicycle supporting device of the present invention is an adapter, preferably a bent plate-shaped piece usually of metal, with a bicycle supporting surface between a pair of fork prongs for supporting a bicycle in the region of the bottom bracket bearing of the bicycle, and particularly at its bottom bracket spindle. There is a telescoping support for the horizontal arm of the adapter. For best results, the adapter is comprised of a one piece body of material that is comprised of fiber reinforced plastic material. At least one or both of the plate shaped arms of the adapter includes reinforcing ribs which may be integrally formed with the adapter. The connection between the support and the adapter and the support comprises a plug-in connection with a fastener. The edge regions of the adapter, where the fork prongs and the fork base that connects the prongs extend toward the bicycle part may be thinner to extend to the bottom bracket spindle through a narrow space.

Other features and advantages of the present invention will become apparent from the following description of the invention which refers to the accompanying drawings.

BRIEF DESCRIPTION OF THE DRAWINGS

The invention will be described below by means of preferred illustrative embodiments with reference to the drawings, in which:

FIG. 2 is a vertical sectional view of a fork-shaped adapter in FIG. 1 seen along the plane II—II of FIG. 3 and in actual size, FIG. 3 is a view of the adapter in FIG. 2 from the left, FIG. 4 is a plan view of the adapter in FIG. 2, FIG. 5 is a vertical section along the plane V—V in FIG. 6 of another embodiment of a fork-shaped adapter in accordance with the invention, FIG. 6 is a view of the adapter in FIG. 5 from the left and FIG. 7 is a plan view of the adapter in FIG. 5.

DESCRIPTION OF EMBODIMENTS OF THE INVENTION

Figure 1:
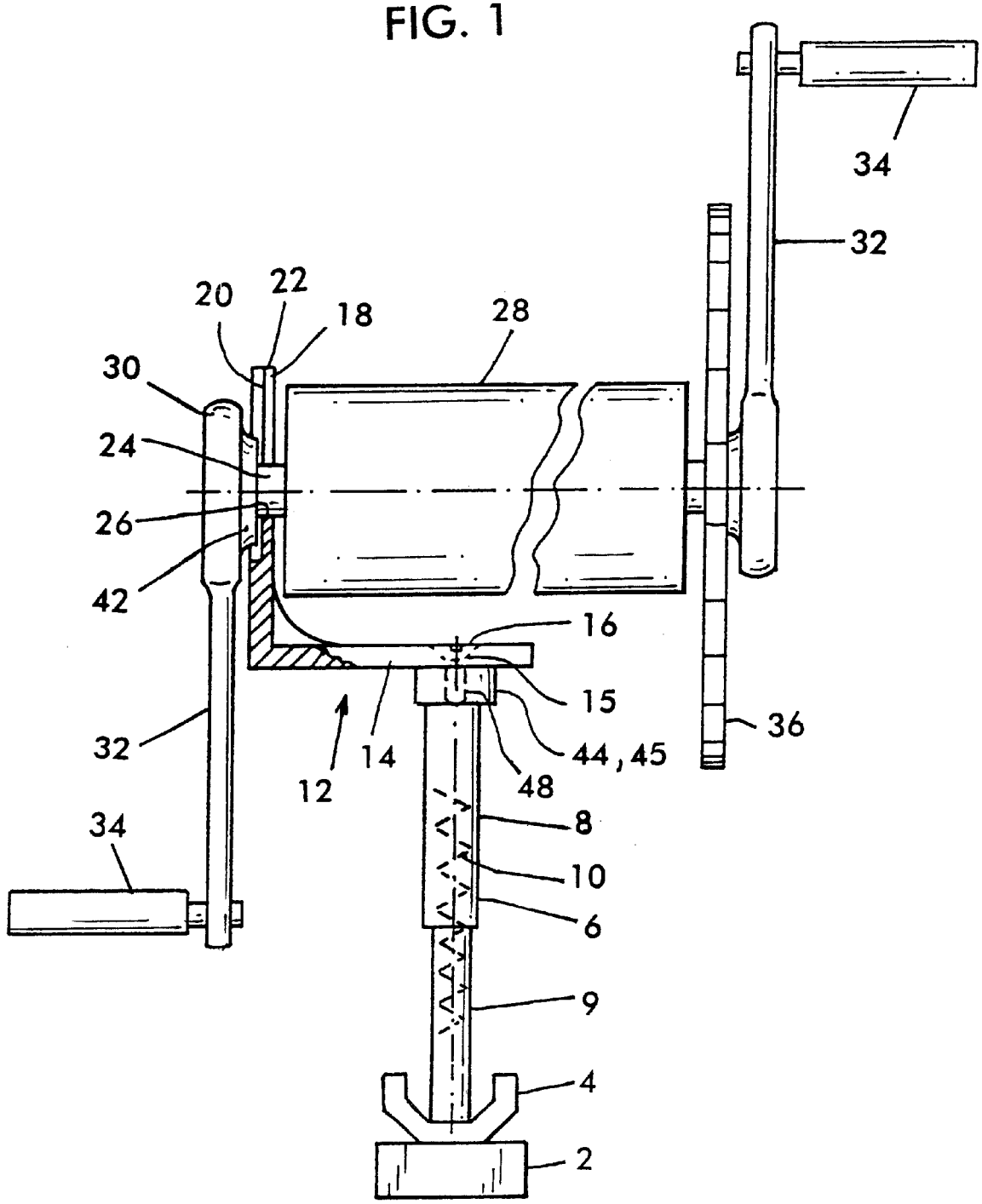
FIG. 1 is a schematic diagram, not to scale, of a preferred embodiment of a bicycle-supporting device of a bicycle stand according to the invention, shown supporting a bottom bracket spindle.

The bicycle stand shown in FIG. 1 has a support 2 (represented only diagrammatically), which can be a foot standing on a base or can be a tube. On the support is an upwardly open rail 4 for securing a bicycle or a multiplicity of such rails 4 for securing a multiplicity of bicycles. The rail 4 can have a U section made of metal or some other material, or be a rail shaped in some other way to provide lateral limbs between which the wheels of a bicycle can be placed. A telescoping support 6 projects upward from and is secured on the rail 4 and/or on the support 2. It comprises two vertically nested tubes 8 and 9, which are telescoped apart vertically by at least one spring 10 arranged in them and which can be compressed counter to the force of the spring 10 by the weight of a bicycle until the wheels of the bicycle descend to stand on the rail 4. For this purpose, an adapter 12 is secured on the upper end of the upper telescopic tube 8.

The adapter 12 is a one-piece body of material comprised of fiber-reinforced plastic, preferably polyamide reinforced with glass fibers. It has a horizontal limb 14, the end of which is secured on the upper end of the upper telescopic tube 8 by being screwed on by a screw 16 inserted from above through an opening 15 in the limb 14, for example. The adapter 12 further has a vertical limb 18 with an upwardly open cutout 20 between two upward-projecting fork-like prongs 22 for receiving and supporting a bottom bracket spindle 24. The bottom bracket spindle 24 rests on the fork base 26 of the cutout 20 and compresses the telescopic support 6 vertically, counter to the force of the spring 10, when the bicycle is placed on the rail 4. The prongs 22 are thin enough to project into the narrow gap between a bottom bracket shell 28 and a crank eye 30 of a pedal crank 32, which has a pedal 34 in a manner known per se. The adapter 12 is situated on that side of the bottom bracket shell 28 which faces away from a chain wheel 36 of the bottom bracket spindle 24.

The cutout 20 between the prongs 22 preferably has a wide upper region 37 and, in relation to this, a narrower lower region 39, with each of these regions becoming narrower in a semicircle toward the bottom. Extending around the inner periphery of the prongs 22 and the base 26, on that side of the vertical limb 18 which points outward away from the bottom bracket shell 28, is a recessed limb region 38 which extends as far as the inner peripheral edge and into which a lateral part 42 of the crank eye 30 extends. That part 42 is concavely tapered in diameter, for example, if the interspace between the crank eye 30 and the bottom bracket 28 is very small. The holding function is assured even for those cases in which the remaining distance between the pedal crank and the bottom bracket is only measured in tenths of a millimeter. The lateral edge of the upper, wider region 37 is seated on the concavely tapered part 42 of the crank eye 30 if the interspace between the crank eye 30 and the bottom bracket 28 is less than tie thickness of the fork prongs 22.

A stud or, as in the drawings, a tubular stub 44 projects downward from the horizontal limb 14 on its end section remote from the vertical limb 18 and is in one piece with the adapter 12. The upper end of the upper telescopic tube 8 is mounted on the tubular stub 44 and is surrounded by a self-contained rib line 45 of the adapter 12. The rib line 45 and the adapter 12 are of a single piece of plastic, the rib line being stabilized by the telescopic tube 8. The cross sections of the tubular stub 44 and of the rib line 45 are matched to the cross section of the telescopic tube 8 and hold the telescopic tube 8 between them without its becoming loose. The cross section can be circular or angular, e.g. it is preferably quadratic, as shown. A cone or wedge 48 is inserted into a downwardly open passage 46 of the tubular stub 44 and clamps the wall of the tubular stub 44 transversely outward against the telescopic tube 8 by virtue of the axial tension of the screw 16, which is screwed into the wedge 48. The passage 46 adjoins the through opening 15 axially and has a larger cross section than the latter. The passage 46 can become narrower in a funnel shape toward the top, corresponding to the shape of the wedge 48.

The regions 37 and 39 of different widths between the prongs 22 allow bottom bracket spindles 24 or crank eyes 30 or bottom bracket shells 28 of different diameter to be accommodated in the cutout 20.

Respective reinforcing ribs 50 and 51 are integral with the vertical limb 18 and extend over its entire height and are formed on the outside of the limb, along both of its lateral edges. On its underside, along its outer edge and also in between, in particular close to the tubular stub 44, the horizontal limb 14 is provided with reinforcing ribs 52, 53, 54 and 55. The two limbs 14 and 18 are furthermore reinforced and supported against one another by webs 56 and 57 or ribs which bridge them.

The embodiment shown in FIGS. 5, 6 and 7 is identical to the embodiment in FIGS. 2, 3 and 4, except that it does not have a recessed limb region 38 to reduce the thickness of the prongs 22 and of the fork base 26 along their inner edge regions.

If the axial gap between the bottom bracket shell 28 and the crank eye 30 is significantly larger than the thickness of the prongs 22 and the fork base 26, a spacer, e.g. an axially resilient element, can additionally be inserted into this gap to ensure that the bicycle stands vertical on the adapter 12.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bicycle-supporting device of a bicycle stand for the presentation of bicycles, comprising an adapter having an upwardly pointing fork with fork prongs, at least one bicycle-supporting surface between the fork prongs for supporting a bicycle in the region of a bottom bracket bearing of the bicycle, a support element for the adapter, and a support connection part for connecting the adapter to a support element and the adapter comprising a one-piece body of material comprised of fiber-reinforced plastic, wherein the supporting element is an upper part of a telescoping support including a spring which pushes apart the telescoping support, and the spring can be compressed counter to its spring force by the weight of a bicycle placed on the adapter.

2. The bicycle-supporting device as claimed in claim 1, wherein the one-piece body of material of the adapter is comprised of portions which are thin plate-shaped and includes reinforcing ribs projecting from the portions.

3. The bicycle-supporting device as claimed in claim 1, wherein the one-piece body of material is bent at an angle and defines a first upward-projecting angle limb having the fork prongs thereon, and a second angle limb which extends transversely to the first limb and forms the support connection part.

4. The bicycle-supporting device as claimed in claim 3, wherein at least one of the two angle limbs is of thin plate-shape and includes integrally formed reinforcing ribs projecting from it.

5. The bicycle-supporting device of claim 3, wherein the one-piece body of material is composed of polyamide reinforced with glass fibers.

6. The bicycle-supporting device as claimed in claim 1, wherein the support connection part comprises a plug-in connection part into which the supporting element can be plugged.

7. The bicycle-supporting device as claimed in claim 6, wherein the plug-in connection part includes a tubular projection as a plug-in connection element.

8. The bicycle-supporting device of claim 7, wherein the support connection part has a through opening; a fastening element received in the through opening for fastening the adapter to the support element.

9. The bicycle device of claim 6, wherein the support connection part has a through opening; a fastening element received in the through opening for fastening the adapter to the support element.

10. The bicycle-supporting device of claim 1, wherein a fork base connects the fork prongs; the fork prongs and the fork base connecting them include a recessed region on their outer face which makes them thinner along their inner edge region than that region of the prongs and the fork base which is remote from the edge so that a pedal crank eye can project into the recessed region and the thinner edge region can be placed on a bottom bracket spindle of the bicycle through a narrow interspace between the bottom bracket eye and a bottom bracket shell.

11. The bicycle-supporting device as claimed in claim 1, wherein:

said bicycle-supporting surface and said fork prongs define a recess shaped to receive and support a bottom bracket bearing spindle within said recess; and said bicycle-supporting surface and said fork prongs are sufficiently thin and plate-shaped near said recess to fit between a bottom bracket bearing shell and a crank edge of a pedal crank coupled to said bottom bracket bearing spindle.

12. The bicycle-supporting device as claimed in claim 11, further comprising:

a bevel along a lateral edge of said recess; and a lateral width of said recess being thinner near said bevel than other portions of said bicycle-supporting surface and said fork prongs, whereby a crank eye of said pedal crank can project into said bevel.

13. The bicycle-supporting device as claimed in claim 11, wherein the one-piece body of material is bent at an angle and defines a first upward-projecting angle limb having the fork prongs thereon, and a second angle limb which extends transversely to the first limb and forms the support connection part.

14. The bicycle-supporting device as claimed in claim 13, wherein at least one of the two angle limbs is of thin plate-shape and includes integrally formed reinforcing ribs projecting from it.

15. The bicycle-supporting device as claimed in claim 14, wherein said recess defines a lower semicircular region and an upper semicircular region, said lower semicircular region begin smaller in size than said upper semicircular region.

16. The bicycle-supporting device as claimed in claim 15, wherein the one-piece body of material is bent at an angle and defines a first upward-projecting angle limb having the fork prongs thereon, and a second angle limb which extends transversely to the first limb and forms the support connection part.

17. The bicycle-supporting device as claimed in claim 16, wherein at least one of the two angle limbs is of thin plate-shape and includes integrally formed reinforcing ribs projecting from it.

18. The bicycle-supporting device as claimed in claim 11, wherein said recess defines a lower semicircular region and an upper semicircular region, said lower semicircular region begin smaller in size than said upper semicircular region.

* * * * *